United States Patent [19]

Lu

[11] Patent Number: 5,520,094
[45] Date of Patent: May 28, 1996

[54] COOKING DEVICE

[75] Inventor: Li-Hua Lu, Taoyuan, Taiwan

[73] Assignee: Eloofa Industries Co., Ltd., Taipei, Taiwan

[21] Appl. No.: 417,083

[22] Filed: Apr. 5, 1995

[51] Int. Cl.$^6$ ............................ A21D 2/00; A21D 8/00; A47J 27/00; B01F 7/22
[52] U.S. Cl. ............................ 99/327; 99/331; 99/348; 99/468; 366/98; 366/146; 366/314; 366/601
[58] Field of Search ............................ 99/325–328, 329 R, 99/331–333, 337, 338, 348, 352, 353, 467, 468, 483, 484, 486; 366/69, 96–98, 144–147, 314, 601; 426/504, 512

[56] References Cited

U.S. PATENT DOCUMENTS

| | | | |
|---|---|---|---|
| 4,844,048 | 7/1989 | Aruga et al. | 126/21 R |
| 4,903,587 | 2/1990 | Nagasaka et al. | 99/325 |
| 4,930,899 | 6/1990 | Aoyama | 366/98 |
| 4,957,040 | 9/1990 | Nakakura et al. | 99/348 |
| 5,054,383 | 10/1991 | Cho | 99/327 |
| 5,076,153 | 12/1991 | Takahashi et al. | 366/146 |
| 5,145,252 | 9/1992 | Oh | 366/601 |
| 5,351,606 | 10/1994 | Matsuzaki | 366/314 |
| 5,386,763 | 2/1995 | Chen | 99/357 |
| 5,402,710 | 4/1995 | Chen | 99/348 |
| 5,410,949 | 5/1995 | Yung | 366/146 |
| 5,415,081 | 5/1995 | Yoshida et al. | 99/326 |

*Primary Examiner*—Timothy F. Simone
*Attorney, Agent, or Firm*—Poms, Smith, Lande & Rose

[57] ABSTRACT

A cooking device includes an electrical motor disposed within a housing to drive, via a mechanical transmission including belt-pulley system, a stirring blade rotatably disposed within a food container which is also fixed within the housing for stirring food placed within the food container. Electrical heating elements and temperature sensor are provided within the housing for respectively heating the food container and determining the temperature of the food container. A micro-processor based control system is provided to be in electrical connection with the motor, the electrical heating elements and the temperature sensor for controlling the operation of the cooking device. The control system has a control panel to be accessible and operated by a user.

7 Claims, 4 Drawing Sheets

COOKING DEVICE

FIELD OF THE INVENTION

The present invention relates to a cooking device and in particular to a cooking device having an automatic stirring system incorporated therein.

BACKGROUND OF THE INVENTION

In cooking a paste-like or very thick soup, it is sometimes required to stir the soup during a heating process in order to prevent a particular portion of the food to be cooked for to long a time by being placed too close to the heating source and thus causing scorching. Unfortunately, such a stirring operation is boring.

It is therefore desirable to provide a cooking device having an automatic stirring system integrated therein to overcome such a boring stirring problem.

SUMMARY OF THE INVENTION

It is the principal object of the present invention to provide a cooking device having an electrical motor to drive a stirring blade rotatably disposed within a food container for stirring the food placed within the food container so as to avoid scorching of food.

An additional object of the present invention is to provide a cooking device having a large interior space provided above the electrical motor to enhance dissipation of heat generated during the operation of the electrical motor.

To achieve the above objects, there is provided a food container comprising an electrical motor disposed within a housing to drive, via a mechanical transmission including a belt-pulley system, a stirring blade rotatably disposed within a food container which is also fixed within the housing for stirring food placed within the food container. Electrical heating elements and a temperature sensor are provided within the housing for respectively heating the food container and determining the temperature of the food container. A microprocessor based control system is provided to be in electrical connection with the motor, the electrical heating elements and the temperature sensor for controlling the operation of the cooking device. The control system has a control panel to be accessible and operated by a user.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENT

Figure 1:
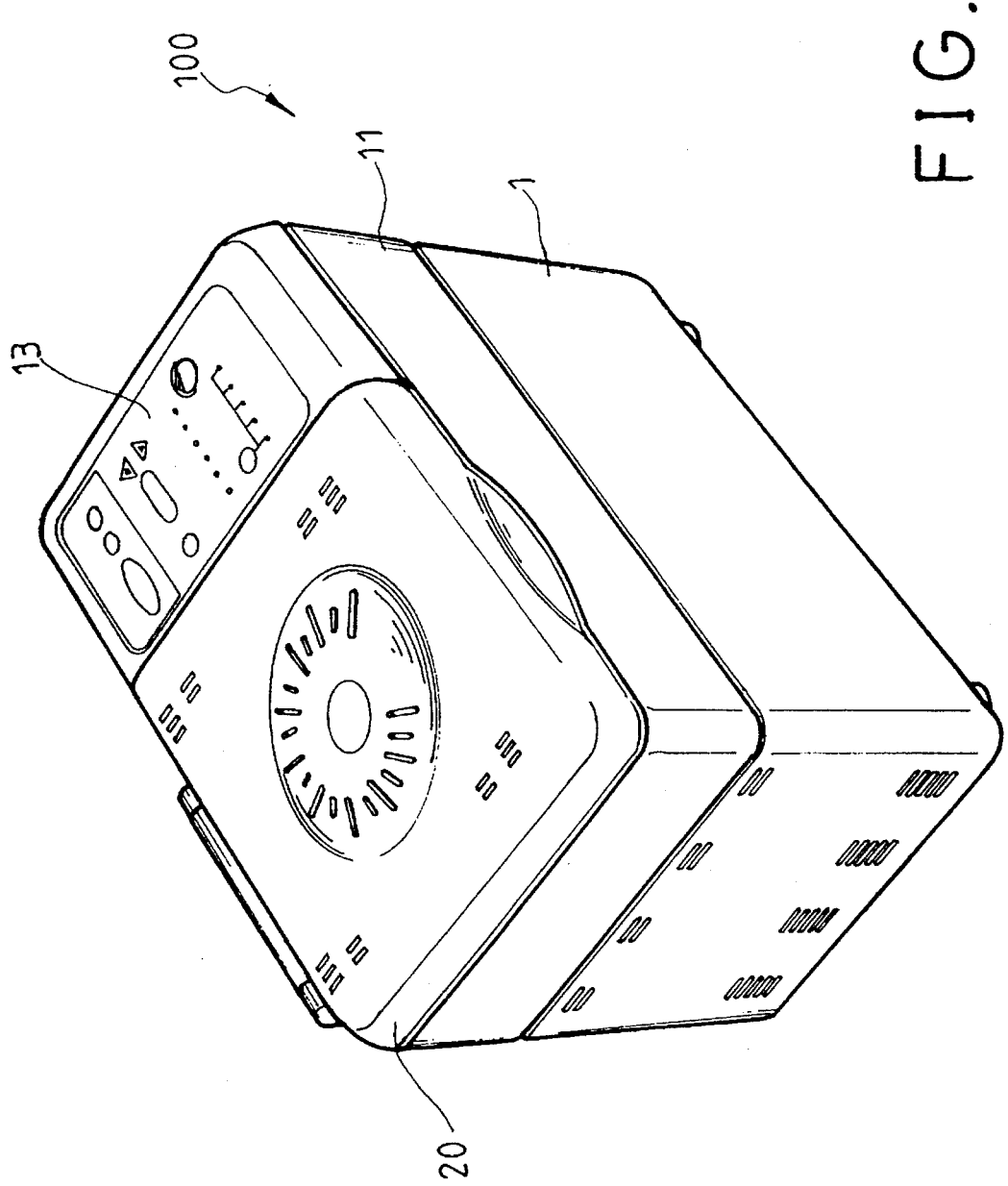
FIG. 1 is a perspective view showing a cooking device constructed in accordance with the present invention.
Figure 2:
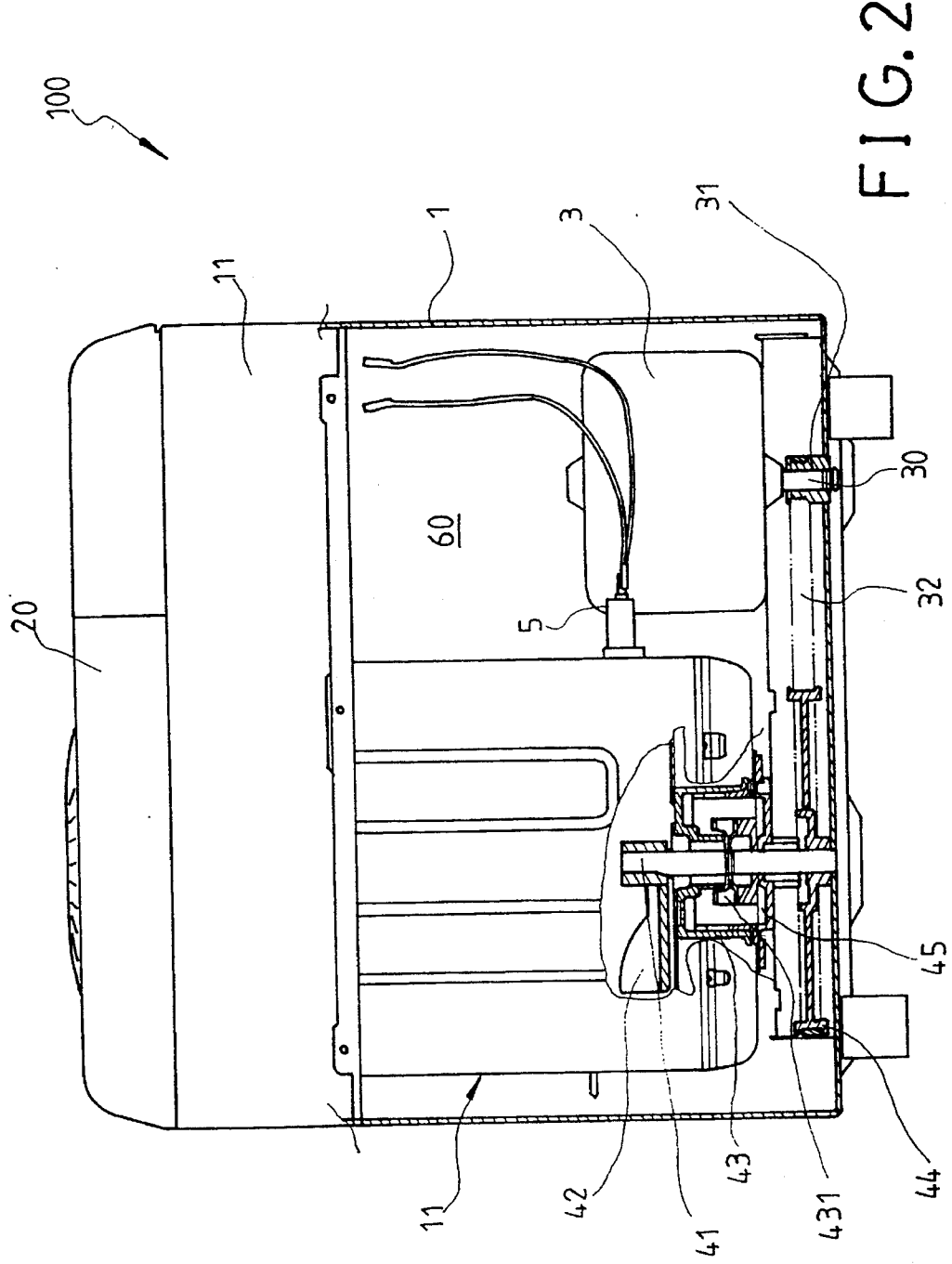
FIG. 2 is a side elevational view, partially broken, showing inside details of the cooking device of FIG. 1.
Figure 4:
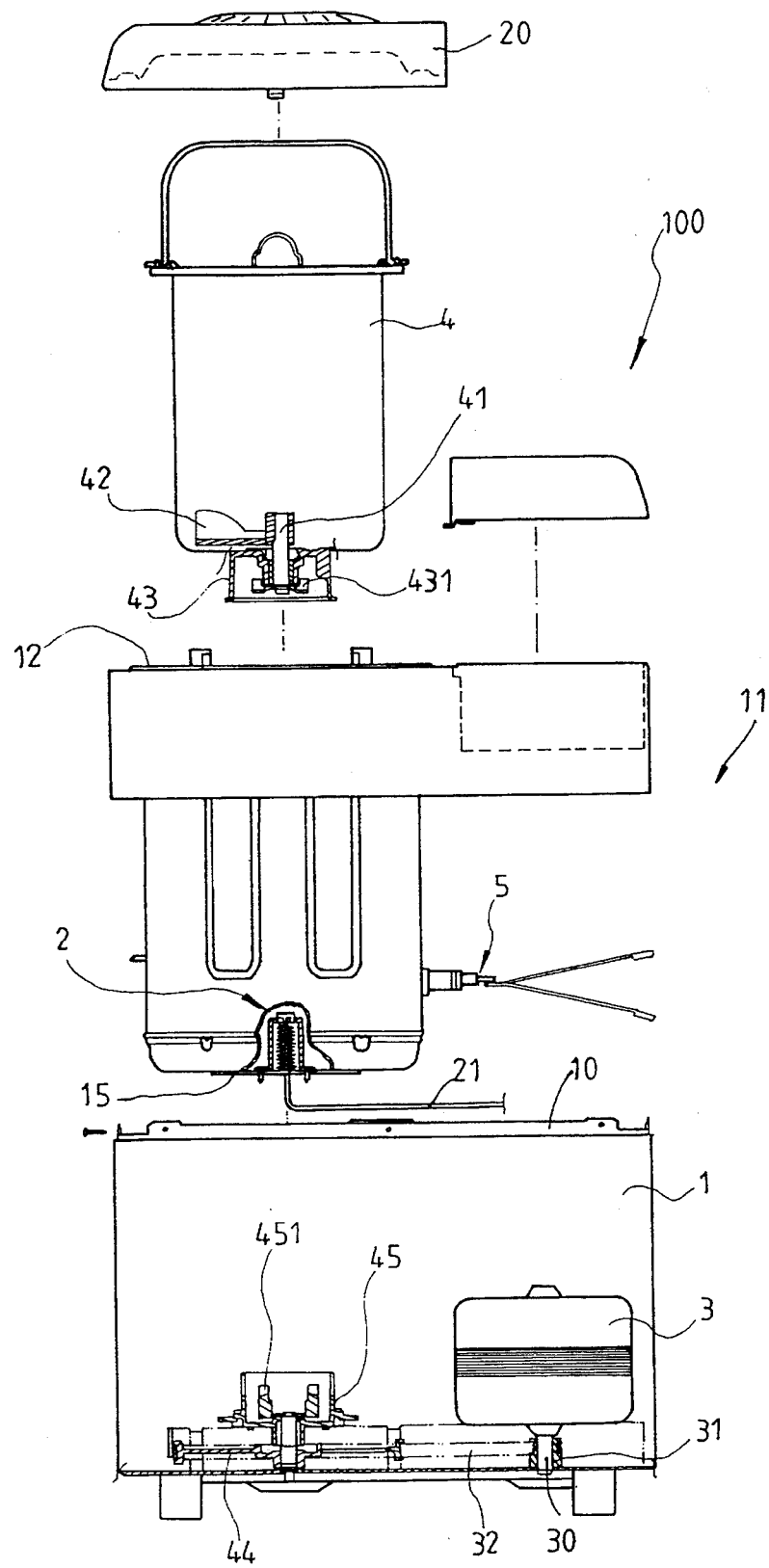
FIG. 4 is an exploded side elevational view of the cooking device of the present invention.

With reference to the drawings and in particular to FIGS. 1, 2 and 4, wherein a cooking device constructed in accordance with the present invention, generally designated with the reference numeral 100, is shown, the cooking device 100 comprises a housing 1 having an open top 10 into which an outer container member 11 is received. The outer container member 11 has formed thereon a top opening 12 to receive therein an inner container member 4. A cover member 20 is to pivotally connected to the top opening 12 of the outer container member 11 to openably close the top opening 12 and thus shield the inner container member 4 inside the outer container member 11.

Food (not shown) to be cooked or heated is placed inside an interior space defined by the inner container member 4 and heated by electrical heating elements 5 mounted within the outer container member 11.

As is known to those having ordinary skill in the art, the cooking device 100 may be provided with micro-processor based control system 13 (see FIG. 1) which comprises a control panel formed on the housing 10 to be accessible and operated by a user to select and set cooking process. This is a well known technique and thus no further detail is needed herein.

Such a control system 13 may be in electrical connection with a temperature sensor 2, such as a thermometer, disposed inside the outer container member 11 by means of for example wire 21 to determine the temperature associated with the container members 4 and 11 for control purpose. Apparently, the electrical heating elements 5 are also controlled by the control system 13 partly in response to the temperature sensed by the temperature sensor 2.

Figure 3:
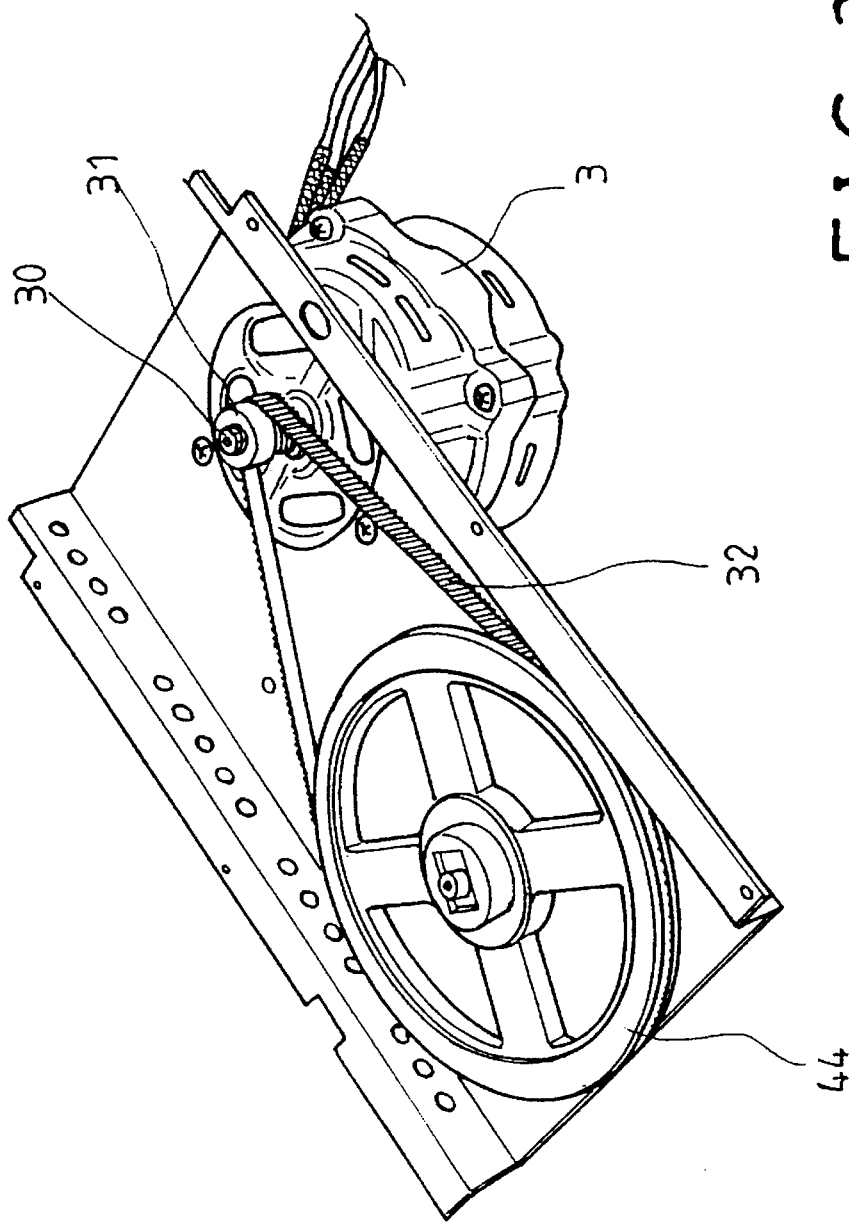
FIG. 3 is a perspective view showing a belt-pulley transmission system driven by a motor.

A rotational motion source, such an electrical motor 3 shown in the drawings and in particular in FIG. 3, is disposed inside the housing 1, having a driving pulley 31 mounted to an output spindle 30 thereof. A support member 45 which is rotatably disposed inside the housing 1 has a driven pulley 44 fixed thereon to be rotatable in unison therewith. A belt 32, preferably a timing belt, is connected between the driving pulley 31 and the driven pulley 44 to transmit the rotation of the motor spindle 30 to the rotational support member 45.

The rotational support member 45 is preferably formed as a cylinder like member having a central recess within which a plurality of driving tabs 451 are mounted. Corresponding to the rotational support member 45, a cylindrical member 43 is formed on and rotatable relative to the bottom of the inner container member 4 which partially extends through a central opening 15 formed on the bottom of the outer container member 11 to fit over the rotational support member 45, as shown in FIG. 2. The cylindrical member 43 has two driven tabs 431 formed therein, corresponding to the driving tabs 451 disposed inside the rotational support member 45 to be in driving engagement therewith.

The cylindrical member 43 comprises a shaft 41 integrated thereto and extending at an upper end thereof into the interior space of the inner container member 4 with stirring blade means 42 mounted to the upper end of the shaft 41 so that when the cylindrical member 43 is driven to rotate by the motor 3 via the driving engagement between the driven tabs 431 of the cylindrical member 43 and the driving tabs 451 of the rotational support member 45, the blade means 42 rotates inside the inner container member 4 to stir the food (not shown) placed therein.

In the embodiment illustrated, the housing 1 is provided with a large interior space 60 (FIG. 2) above the electrical motor 3. This allows the heat generated during the operation of the motor 3 to be dissipated in a more efficient manner. Also, using timing belt 32 to transmit rotational motion from the motor 3 to the blade 42 inside the inner container member 4 helps reducing noise generated by the device.

It is apparent that the motor 3 and the heating elements 5 may be controlled by the control system 13 which may be in turn operable by means of programs or micro-codes running on the micro-processor of the control system 13.

Although a preferred embodiment has been described to illustrate the present invention, it is apparent that changes and modifications in the specifically described embodiment can be carried out without departing from the scope of the invention which is intended to be limited only by the appended claims.

What is claimed is:

1. A cooking device comprising:

a housing enclosing an inner container having an interior and a bottom;

a shaft having a top end extending into the interior of the inner container having a radially extending blade, and a bottom end that includes radially extending driven tabs contained within a rotating cylindrical member, wherein the rotating cylindrical member rotates with the shaft relative to the inner container bottom;

a motor providing torque; and a driven pulley assembly, connected by a belt to the motor, wherein the driven pulley assembly includes a support member containing therein driving tabs, wherein the driving tabs engage and rotate the driven tabs, and the support member engages and rotates the rotating cylindrical member therealong.

2. The cooking device of claim 1, wherein the belt includes a timing belt having teeth.

3. The cooking device of claim 1, wherein the housing includes an interior unoccupied space directly above the motor.

4. The cooking device of claim 1, wherein the device further comprises a microprocessor connected to the motor.

5. The cooking device of claim 1, wherein the device further comprises an outer container receiving the inner container and having a central opening in a bottom through which the rotating cylindrical member passes to engage the support member, which outer container further comprises a temperature probe disposed in the bottom thereof.

6. The cooking device of claim 5, wherein the outer container includes heating elements controlled by the microprocessor.

7. The cooking device of claim 4, wherein the microprocessor is connected to the temperature probe.

* * * * *